United States Patent [19]
Browne

[11] Patent Number: 5,912,039
[45] Date of Patent: Jun. 15, 1999

[54] METHOD OF GENERATING A FROTHED MILK COMPOSITION

[75] Inventor: Peter Browne, Aurora, Canada

[73] Assignee: Browne & Co. Ltd., Markham, Canada

[21] Appl. No.: 08/932,100

[22] Filed: Sep. 17, 1997

Related U.S. Application Data

[63] Continuation of application No. 08/653,598, May 24, 1996, Pat. No. 5,730,525.

[51] Int. Cl.⁶ ................................................. A23G 9/04
[52] U.S. Cl. ........................................ 426/565; 426/519
[58] Field of Search ......................... 366/64, 65, 96–98, 366/197, 198, 204, 206, 315, 317, 342, 343; 426/519, 565, 569

[56] References Cited

U.S. PATENT DOCUMENTS

| | | | |
|---|---|---|---|
| 1,973,091 | 9/1934 | Miller | 366/206 |
| 2,222,601 | 11/1940 | Blish et al. | 366/206 |
| 2,288,063 | 6/1942 | Ashlock, Jr. | 366/197 X |
| 2,436,585 | 2/1948 | Mangold | 366/315 X |
| 2,507,482 | 5/1950 | Scott . | |
| 2,550,656 | 4/1951 | Knechtges | 426/565 X |
| 2,607,566 | 8/1952 | Saunders | 366/315 X |
| 2,941,885 | 6/1960 | Tomlinson | 426/569 |
| 3,061,443 | 10/1962 | McLaughlin . | |
| 3,084,052 | 4/1963 | McLaughlin . | |
| 3,086,563 | 4/1963 | Patten et al. | 366/206 X |
| 3,379,416 | 4/1968 | Smader et al. | 366/206 |
| 3,479,187 | 11/1969 | Arbuckle | 426/569 |
| 4,021,583 | 5/1977 | Arden | 426/565 |
| 4,305,670 | 12/1981 | Moskowitz et al. | 366/197 |
| 4,351,612 | 9/1982 | Valbona et al. | 366/197 X |
| 4,374,155 | 2/1983 | Igoe et al. | 426/569 |
| 4,448,114 | 5/1984 | Mayer | 426/519 X |
| 4,497,834 | 2/1985 | Barta | 426/582 |
| 4,571,338 | 2/1986 | Okonogi et al. | 426/569 |
| 4,948,614 | 8/1990 | Feldpausch | 426/519 |
| 5,106,643 | 4/1992 | Laufer | 426/565 |

FOREIGN PATENT DOCUMENTS

| | | | |
|---|---|---|---|
| 2811356 | 9/1979 | Germany | 426/569 |
| 3117940 | 8/1983 | Germany | 426/569 |
| 624231 | 5/1949 | United Kingdom | 366/197 |

*Primary Examiner*—Charles E. Cooley
*Attorney, Agent, or Firm*—Swabey Ogilvy Renault

[57] ABSTRACT

A device and method for generating a frothed milk product from a milk composition employs a planar agitator blade having opposed, smooth flat faces extending perpendicularly of a longitudinal axis of rotation, and a smooth cylindrical outer wall between the flat faces; the outer wall has a circumferential length significantly greater than the distance between the opposed faces. The device produces thick milk shakes even when employing no-fat or low fat milk or yogurt in place of normal homogeneous milk. A blender having a blender blade with opposed flat surfaces and a smooth cylindrical outer blade wall, and having ribs extending radially outwardly along the opposed surfaces, serves to puree fruit or vegetable morsels with the milk composition, to produce fruit or vegetable flavored milk shakes.

10 Claims, 3 Drawing Sheets

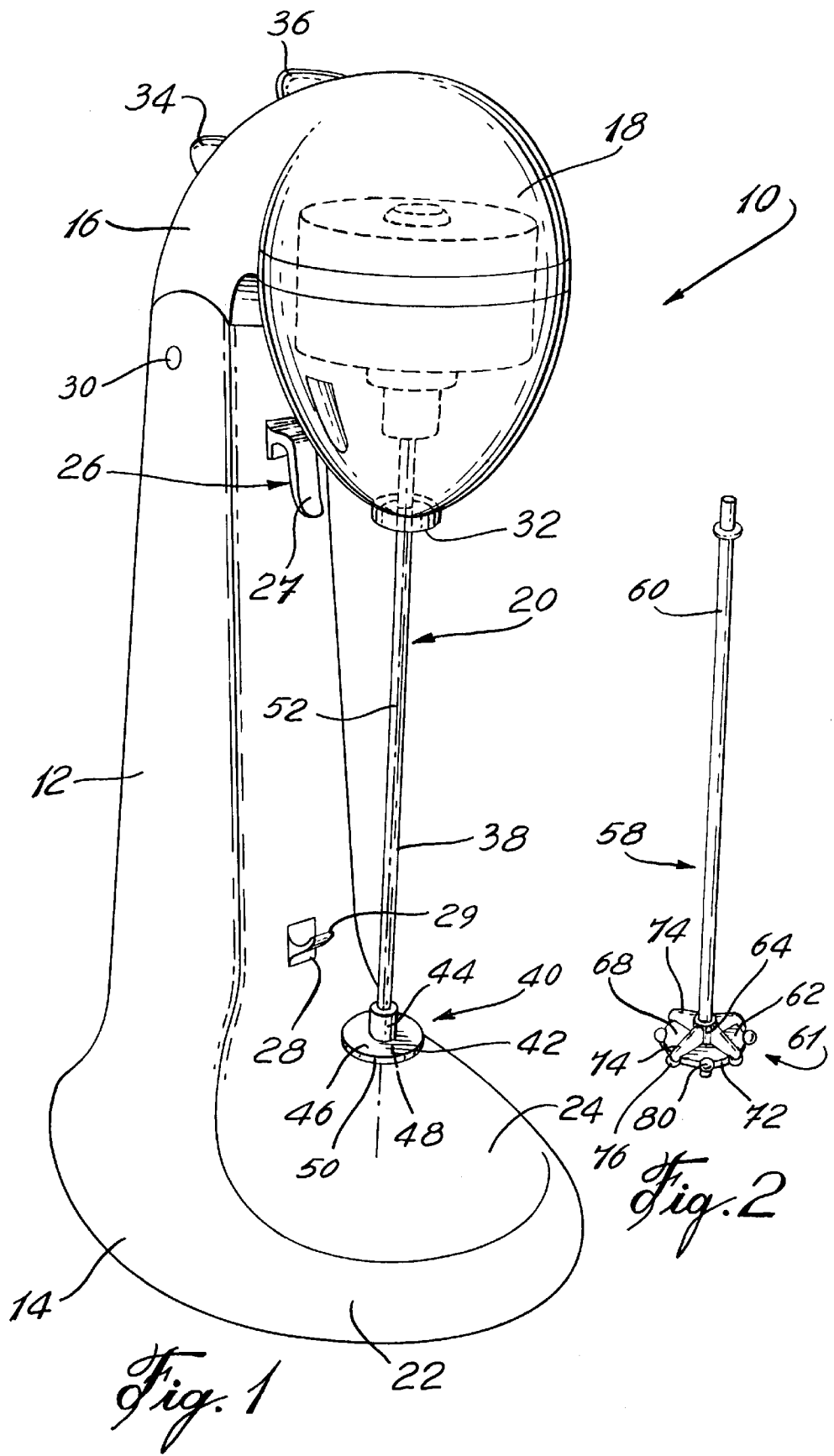

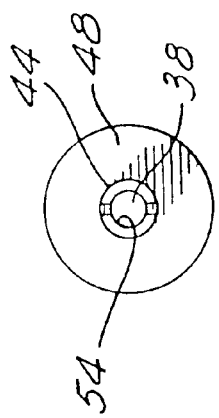
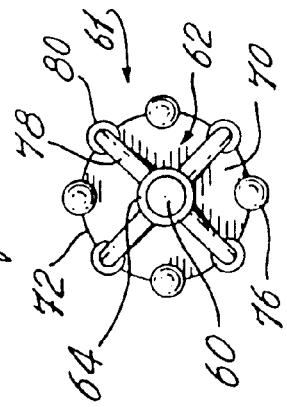
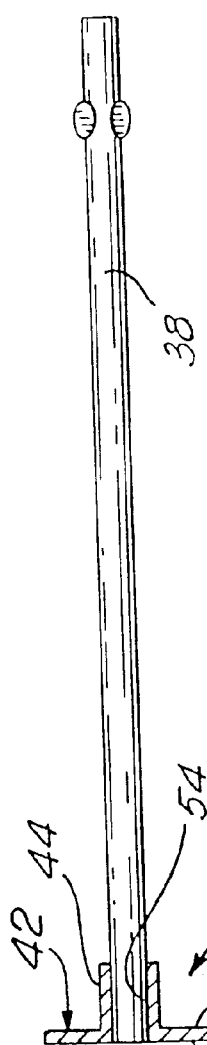
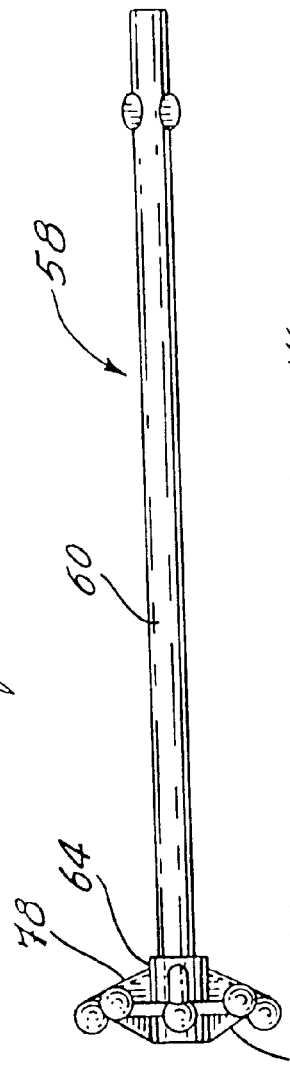
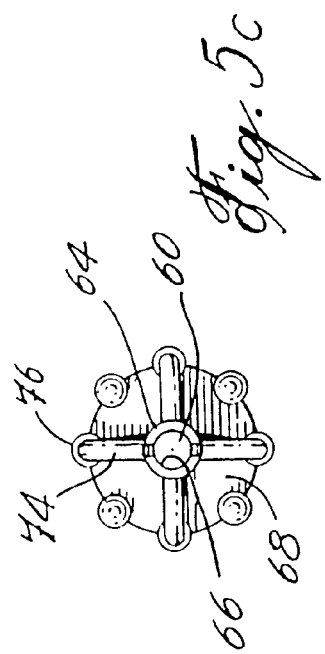

METHOD OF GENERATING A FROTHED MILK COMPOSITION

CROSS-REFERENCE TO RELATED APPLICATION

This is a Continuation of U.S. application Ser. No. 08/653,598, filed May 24, 1996, and now U.S. Pat. No. 5,730,525.

BACKGROUND OF THE INVENTION a) Field of the Invention

This invention relates to a device and method for generating a frothed milk product, especially thick milk shakes and milk froth for cappuccino.

b) Description of Prior Art

Milk shake machines for domestic or home use employ an agitator blade rotating at low speed to generate turbulence and mix ice cream and milk while entraining air bubbles to form a homogeneous mixture. These machines employ normal homogeneous milk.

Recently very thick milk shakes have become popular through their availability at fast-food chain outlets such as MacDonald's restaurants. These very thick milk shakes are developed employing a greater proportion of ice cream than conventional milk shakes, in commercial equipment having significantly more powerful motors than employed in milk shake machines designed for home use.

Milk shake machines developed for home or domestic use do not have the power to produce these popular very thick milk shakes, and their motors become bogged down and stressed when a mixture of thick consistency employing a large amount of ice cream is used. It is usually necessary to interrupt the mixing and allow the ice cream to soften, or add more milk.

Additionally milk shale machines developed for home use do not function well to produce a milk shake of thickened consistency when low fat or no-fat milks or yogurts are substituted for normal homogeneous milk and yogurt or low fat ice cream is substituted for normal ice cream.

Milk shakes thus tend to be of high fat content and the consumer does not have the option of employing low fat milk and yogurt or low fat ice cream to prepare a milk shake of thick consistency at home. When the low fat milk or yogurt is employed in existing milk shake machines designed for home use, the result is a thin liquid mixture.

SUMMARY OF THE INVENTION

It is an object of this invention to provide a device and method for home use which enables generation of a frothed milk product of high thickness, including thick milk shakes and froth for cappuccino.

It is a further object of this invention to provide a device and method for home use which enables generation of thick milk shakes and froth for cappuccino employing non-fat milk or low fat milk.

It is a particular object of this invention to provide a device and method for home use which enables generation of a thick non-fat or low fat milk shake, employing non-fat or low fat milk or yogurt, without high fat ice cream.

It is yet another object of this invention to provide a device and method which enables generation of pureed fruit or vegetable with a milk composition, for subsequent generation of a fruit or vegetable flavoured milk shake.

In accordance with one aspect of the invention there is provided a device for generating a frothed milk product comprising: a free-standing support member, an agitator comprising a shaft having an inner end, an elongate body and an outer end, said inner end being removably mounted in said support member for rotation of said shaft about a longitudinal axis, with said elongate body and outer end projecting from said support member, drive means operably connected to said inner end to rotate said shaft, a planar agitator blade projecting from said outer end, said blade having a pair of opposed, smooth, flat faces extending perpendicularly of said longitudinal axis, and radially outwardly of said shaft, and a smooth cylindrical outer wall between said faces, said outer wall having a circumferential length significantly greater than the distance between said opposed faces.

In accordance with another aspect of the invention there is provided a method of generating a frothed milk product comprising: housing a milk composition in an open vessel, immersing a planar agitator blade in said milk composition, and rotating said agitator blade in said milk composition, about a longitudinal axis at a high speed effective to entrain air in said composition and produce a frothed milk product, said agitator blade having a pair of opposed smooth, flat faces extending perpendicularly of said longitudinal axis, and a smooth cylindrical outer wall between said opposed faces, said outer wall having a circumferential length significantly greater than the distance between said opposed faces.

The planar agitator suitably has a ratio of circumferential length of the cylindrical outer wall to distance between the opposed, smooth, flat faces of about 30:1 to 50:1, preferably about 40:1.

Low fat thick milk shakes are produced in accordance with the invention employing a milk composition based on a milk selected from skim milk, non-fat milk or milk containing 1 or 2%, by weight, of milk fats or low fat yogurt and optionally with low fat yogurt or low fat ice cream.

In accordance with still another aspect of the invention there is provided a device for generating pureed fruit or vegetable in a milk composition comprising: a free standing support member, a blender comprising a blender shaft having an inner end, an elongate body and an outer end, the inner end being removably mounted in the head for rotation of the blender shaft about a longitudinal axis, with the elongate body and outer end projecting from the support member; drive means operably connected to the inner end to rotate the shaft, a blender blade projecting from the outer, end of the blender shaft, said blender blade having upper and lower opposed flat blade faces extending radially outwardly of said blender shaft, a smooth cylindrical outer blade wall between said blade faces, a first plurality of rounded ribs on said upper face, said first plurality extending radially of said blender shaft, each rib terminating in a bulbous member extending from an outer end of the rib, over the blade wall and the outer edge of the lower face; the bulbous members of said first plurality being in circumferentially spaced apart relationship about said blade wall; and a second plurality of rounded ribs on said lower face; said second plurality extending radially of said blender shaft, each rib terminating in a bulbous member extending from an outer end of the rib, over the blade wall and the outer edge of the upper face; the bulbous members of said second plurality being in circumferentially spaced apart relationship about said blade wall.

In still another aspect of the invention there is provided a method of generating pureed fruit or vegetable in a milk composition comprising: housing a mixture of a milk composition and morsels of fruit or vegetable in an open vessel, immersing a blender blade in said milk composition, and rotating said blender blade in said mixture, about a longitudinal axis, at a speed effective to puree said morsels, said blender blade having a pair of opposed flat blade faces extending perpendicularly of said longitudinal axis, and a smooth cylindrical outer blade wall between said opposed faces, said opposed faces comprising an upper face and a flower face, a first plurality of rounded ribs on said upper face, said first plurality extending radially of said longitudinal axis, each rib terminating in a bulbous member extending from an outer end of the rib, over the blade wall and the outer edge of the lower face; the bulbous members of said first plurality being in circumferentially spaced apart relationship about said blade wall; and a second plurality of rounded ribs on said lower face; said second plurality extending radially of said longitudinal axis, each rib terminating in a bulbous member extending from an outer end of the rib, over the blade wall and the outer edge of the upper face; the bulbous members of said second plurality being in circumferentially spaced apart relationship about said blade wall.

BRIEF DESCRIPTION OF DRAWINGS

FIG. 1 is a perspective view of a milk shake machine of the invention;

FIG. 2 is a perspective view of a blender element for use in the machine of FIG. 1;

FIG. 4A is a side view of the agitator element employed in the machine of FIG. 1;

FIG. 4B is a top plan of the agitator element of FIG. 4A;

FIG. 5A is a side view of the blender element of FIG. 2;

FIG. 5B is a bottom plan of the blender element of FIG. 5A; and

FIG. 5C is a top plan of the blender element of FIG. 5A.

DESCRIPTION OF PREFERRED EMBODIMENTS WITH REFERENCE TO THE DRAWINGS

Figure 3:
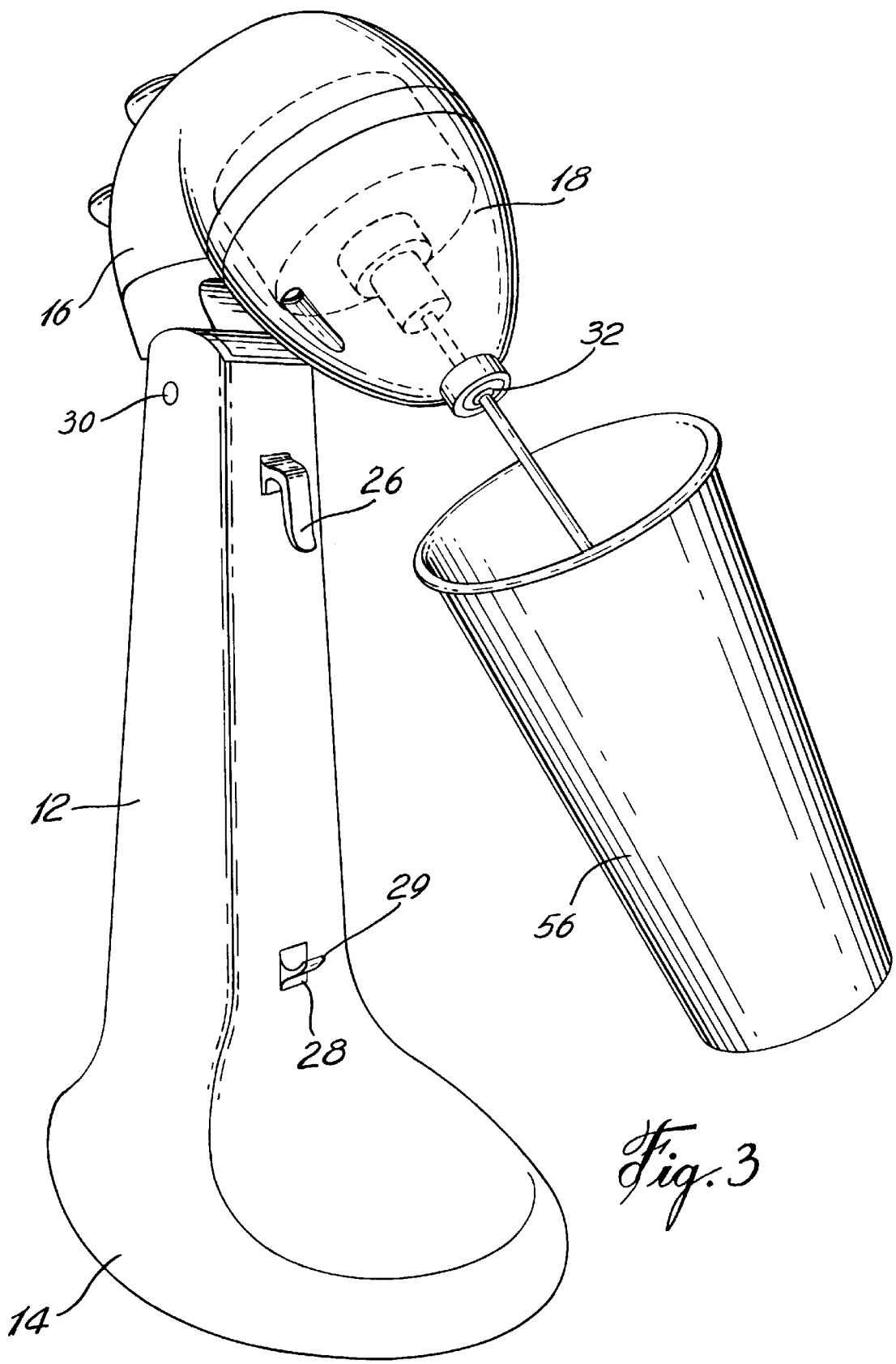
FIG. 3 is a perspective view of the machine of FIG. 1, illustrating the adjustment to locate a vessel about the agitator.

With further reference to FIGS. 1 and 3, a milk shake machine 10 has an elongate support body 12 which extends vertically upwardly from a support base 14. Forwardly extending neck 16 is pivotally mounted about pivot 30 at the upper end of support body 12; and a head 18 extends forwardly of neck 16.

Support base 14 includes a forwardly extending foot 22 within which is defined a cavity or tray 24 which lies vertically below head 18.

A retainer 26 and a ledge 28 extend forwardly from a front face of support body 12 for mounting a vessel 56 containing a milk composition to be frothed. Retainer 26 has an arm 27 spaced from support body 12, which arm 27 engages an interior wall of vessel 56 adjacent the upper rim of the vessel 56. Ledge 28 has a foot 29 which engages a lower rim of vessel 56 to hold vessel 56 in a position adjacent body 12, below head 18.

Head 18 includes a chock 32 in which agitator assembly 20, is removably mounted for rotation. Such chocks are well known and so no details are illustrated.

A motor (not shown), for example, a universal motor, is suitably located within head 18 to rotatingly drive chock 32 with agitator assembly 20 at high speed.

Control switch 34 and pulse button 36 on neck 16 are in operable communication with the motor and a power cord (not shown) for the motor for connection to a supply of electricity may suitably extend downwardly through support body 12 and exit adjacent the base 14 at the rear of body 12.

With further reference to FIGS. 1, 4A and 4B, agitator assembly 20 has a shaft 38 terminating in an agitator 40. Agitator 40 includes a blade 42 extending from a hub 44.

Blade 42 is generally in the form of a thin disc or cylinder having a smooth, flat upper face 46 spaced from a smooth, flat lower face 48, with a smooth cylindrical outer wall 50 therebetween.

A bore 54 extends centrally of hub 44 and blade 42, to receive the outer end of shaft 38; the inner end of shaft 38 being mounted in chock 32 as shown in FIG. 1.

As further shown in FIG. 1, the agitator assembly 20 is mounted in machine 10 for rotation about longitudinal axis 52. The blade 42 is disposed in a plane perpendicular to the shaft 38, the upper and lower faces 46 and 48 being perpendicular to longitudinal axis 52 and extending radially outwardly of hub 44 and shaft 38.

With further reference to FIGS. 2, 5A, 5B and 5C, a blender assembly 58 has a shaft 60 and a blender 61. Blender 61 includes a blender blade 62 and a hub 64. A bore 66 extends through hub 64 and blender blade 62.

Blender blade, 62 has a flat upper face 68 and a flat lower face 70, faces 68 and 70 extending radially outwardly to a cylindrical outer wall 72.

A plurality of upper ribs 74 extend radially outwardly from hub 64 along upper face 68, terminating at their outer ends in bulbous members 76, which bulbous members 76 extend across outer wall 72 on to lower face 70. The upper ribs 74 slope downwardly, outwardly from hub 64 to bulbous members 76.

Lower face 70 has a similar plurality of lower ribs 78 extending radially outwardly from bore 66, terminating in their outer ends at bulbous members 80 which extend over outer wall 72 on to upper face 68. Bulbous members 76 and 80 alternate in spaced apart relationship around outer wall 72. The lower ribs 78 slope upwardly, outwardly from hub 64 to bulbous members 80.

The ribs 74 and 78 have rounded elongate bodies so that blender blade 62 presents a plurality of rounded surfaces formed by the ribs 74 and 78 and the bulbous members 76 and 80, and sharp cutting edges are avoided.

The rounded elongate bodies forming ribs 74 thus have outer rounded faces sloping downwardly, outwardly from the tube 64 to the bulbous members 76; and the rounded elongate bodies forming ribs 78 have outer rounded faces sloping upwardly, outwardly from the hub 64 of the bulbous members 80.

Agitator assembly 20 and blender assembly 58 are removably insertable in machine 10 at chock 32 so as to be rotatingly driven in machine 10.

As indicated the motor driving the agitator assembly 20 or blender assembly 58 is suitably of high power such as provided by a 100 watt universal motor.

In making a milk shake, a milk composition is introduced into vessel 56, agitator assembly 20 is mounted in machine 10; neck 16 with head 18 is pivoted about pivot 30 so that agitator assembly 20 extends away from support body 12, and the vessel 56 is positioned as illustrated in FIG. 3. The neck 16 with head 18 is then pivoted back to the position illustrated in FIG. 1 with the vessel (not shown in FIG. 1) being engaged by retainer 26 and ledge 28 to support vessel 56 adjacent body 12, and below head 18, with agitator 40 immersed in the milk composition.

Rotation of agitator assembly 20 results in a vortex-type mixing of the milk composition, with very little turbulence as a result of the flat and smooth surfaces of the agitator 40. Such mixing entrains air as a very large number of very small bubbles in the mixture, aerating the mixture to a thick consistency. The flat smooth surfaces of agitator 40 produce a mixing movement or motion in the milk composition which is essentially a radial flow of the milk composition away from the blade 42 towards the wall of vessel 56, with a folding or reversal of the flow as the milk composition meets the obstruction presented by the wall of vessel 56, with creation of the vortex which entrains the air.

When normal homogeneous milk is employed the resulting milk shake is of exceptional thickness, and a thick milk shake is obtained even when ice cream is omitted and no-fat or low fat milk or yogurt is employed in place of normal homogeneous milk.

In contrast, if a conventional undulating blade is employed with a milk composition containing no-fat or low fat milk or yogurt a thick milk shake is not achieved.

The thin disc like agitator 40 having flat smooth faces 46 and 48 and a smooth cylindrical wall 50 with the wall 50 having a relatively small height compared to the dimensions of the faces 46 and 48, thus produces effects which are not exhibited by conventional agitators which do not exhibit such flat faces, but have faces with undulating or rippled surfaces.

It is additionally found that the faces 46 and 48 need to be perpendicular to the shaft 38 or the axis of rotation, namely longitudinal axis 52 to achieve these effects. When the machine 10 was operated with an agitator blade similar to the blade 42 in FIGS. 4A and 4B, but with the blade 42 angled relative to the axis 52 so as not to be perpendicular, greater turbulence was observed within the milk composition and the resulting milk product did not have the desired thick characteristics achieved with blade 42. Furthermore disposing the agitator blade at a non-perpenidicular angle to the shaft puts increased vibration and stress on the motor especially as the length of the shaft increases.

In general the shaft 38 of the agitator assembly 20 is longer than in conventional domestic milk shake machines.

As indicated above, when normal homogeneous milk was employed with the ice cream, the resulting milk shake was easily produced and was exceptionally thick and smooth.

Machine 10 can thus be employed with a conventional milk shake composition based on normal homogeneous milk and ice cream to provide smooth milk shakes of exceptional thickness, and can also be employed to provide thick milk shakes based on no-fat or low fat milks, which milk shakes were not previously available with machines for home use.

The device 10 may similarly be employed to froth milk either normal homogeneous milk or no-fat or low fat milk, to provide a topping froth for cappuccino style coffee. This is advantageous in the home since expresso machines designed for home use have difficulty in creating the desired frothing. By use of the machine 10 of the present invention, coffee may be brewed of cappuccino style but without an expresso machine with frothing device, the froth being provided for topping coffee, by the machine 10 of the invention.

The froth is developed from non-fat or low fat milk employing agitator assembly 20 and the resulting frothed milk product is put into a microwaveable container and heated in a microwave oven to form a hot expanded froth which can be spooned onto expresso or strong coffee.

In making milk shakes it is often desired to incorporate in the milk composition, soft fruits or vegetables to provide particular flavours. Existing procedures require that the soft fruits or vegetables be pureed before being introduced into the milk shake container for subsequent shake processing. This necessitates the use and cleaning of a separate blender device in the preparation of the pureed fruits or vegetables.

In the present invention the soft fruits or vegetables may be pureed with the milk composition in device 10 in a preliminary step employing blender assembly 58 in place of agitator assembly 20. The milk composition and the fruits or vegetables to be pureed are introduced into the vessel 56. The vessel 56 is mounted within machine 10 as described above whereafter blender assembly 58 is rotated at high speed. The rounded ribs and bulbous members on the blender assembly 58 are effective in the simultaneous pureeing and blending of the soft fruits and vegetables and avoid the need for dangerous blades and sharp edges while achieving the same results. When the blending is completed machine 10 is adjusted to substitute agitator assembly 20 for blender assembly 58. Machine 10 is then operated with agitator assembly 20 to produce a fruit or vegetable flavoured thick milk shake.

In the case where the milk composition comprises normal homogeneous milk and ice cream, blender assembly may be maintained amounted within machine 10, to first puree the fruits or vegetables and then form a normal milk shake from the pureed fruits or vegetables and the milk composition.

The cavity or tray 24 in foot 22 collects milk product dripping from the agitator assembly 20 after removal of vessel 56, and is readily cleaned.

The motor is controlled by control switch 34 which has high and low settings for rotation. Pulse button 36 permits brief activation and rotation of the agitator assembly 20 or blender assembly 58 as desired.

The low speed setting is suitably employed for producing very thick milk shakes based on normal homogeneous milks and ice cream; and for pureeing fruit or vegetables with blender assembly 58. The high speed setting is employed to develop thick low fat milk shakes based on non-fat or low fat milk or yogurt or both milk and yogurt and with flavouring or pureed fruit or vegetables.

The pulse button 36 has particular application in the mode in which fruit or vegetables are pureed. The blender blade 62 creates significant turbulence and potential splashing of materials out of the vessel 56 and so it is better to employ the blender assembly 58 at a low speed setting, but with periodic bursts of high speed initiated by pulse button 36 to help or improve the pulverization.

The present invention particularly permits the production of a thick milk shake from non-fat or low fat milk or yogurt, or both, without ice cream, which milk shake may be flavoured with flavourings introduced with the milk composition and developed by pureeing fruits or vegetables with the blender assembly.

The following examples illustrate recipes and basic operating conditions of the milk shake machine 10 to develop different frothed milk products.

EXAMPLES

Example 1

OLD FASHIONED MILK SHAKES a) Chocolate Mocha Shake:

| | | |
|---|---|---|
| 2 | small scoops chocolate ice cream | 2 |
| ¾ cup | normal milk | 175 ml |
| 1 tbsp | chocolate sauce | 15 ml |
| 1 tsp | instant coffee crystals | 5 ml |

Using smooth agitator (20) at low speed, mix until rich and frothy.

b) Traditional Vanilla Shake

| | | |
|---|---|---|
| 2 | small scoops vanilla ice cream | 2 |
| ¾ cup | normal milk | 175 ml |
| 1 tsp | vanilla extract | 5 ml |

Using smooth agitator (20) at low speed, mix until rich and frothy.

c) Vanilla Malted Shake

Add 2 tbsp/30 ml of malted milk power to Vanilla Shake recipe of Example 1b).

d) Chocolate Banana Malted Shake

| | | |
|---|---|---|
| 1 | small banana (in pieces) | 1 |
| 2 | small scoops vanilla ice cream | 2 |
| ¾ cup | normal milk | 175 ml |
| 1 tbsp | chocolate sauce | 15 ml |
| 2 tbsp | malted milk powder | 30 ml |

Using blender (58), puree banana with rest of ingredients. Using smooth agitator (20) at low speed, mix until rich and frothy.

e) Strawberry Shake (Raspberry Shake)

| | | |
|---|---|---|
| 2 | small scoops vanilla ice cream | 2 |
| ¾ cup | normal milk | 175 ml |
| ¼ cup | very ripe berries (raspberry or strawberry) | 50 ml |
| 1 tsp | honey | 5 ml |

Using blender (58), puree berries with rest of ingredients. Using smooth agitator (20) at low speed, mix until rich and frothy.

Example 2

LOW FAT MILK SHAKES a) Banana Yogurt Shake

| | | |
|---|---|---|
| ½ cup | 1%, 2% or skim milk | 125 ml |
| ½ cup | fat free unflavoured yogurt | 125 ml |
| 1 | small, ripe banana (in pieces) | 1 |
| 1 tsp | vanilla extract | 5 ml |

Using blender (58), puree banana with the rest of the ingredients. Using smooth agitator (20) at high speed, blend until thick.

b) Peach and Raspberry Yogurt Shake

| | | |
|---|---|---|
| ½ cup | 1%, 2% or skim milk | 125 ml |
| ½ cup | low fat peach yogurt | 125 ml |
| 2 tbsp | frozen raspberries | 30 ml |

Using smooth agitator (20) at high speed, blend until thick.

c) Apricot Shake

| | | |
|---|---|---|
| ¾ cup | 1%, 2% or skim milk | 175 ml |
| 1 | small jar of baby food (apricots) | 128 ml |

Using smooth agitator (20) at high speed, blend until thick.

d) Strawberry or Raspberry Shake

| | | |
|---|---|---|
| ¼ cup | sliced ripe fruit | 50 ml |
| ¾ cup | 1%, 2% or skim milk | 175 ml |
| 1 tbsp | honey | 15 ml |
| 1 tsp | lemon juice | 5 ml |

Using blender (58), puree fruit with the rest of the ingredients at low speed. Using smooth agitator (20) at high speed, blend until thick.

LOW FAT MILK SHAKES e) Peach and Raspberry Shake

| | | |
|---|---|---|
| ½ cup | low fat peach yogurt | 125 ml |
| ½ cup | 1%, 2% or skim milk | 125 ml |
| 2 tbsp | frozen raspberries | 30 ml |

Using smooth agitator (20) at high speed, blend until thick.

f) Strawberry Orange Shake

| | | |
|---|---|---|
| ½ cup | orange juice | 125 ml |
| ½ cup | fat free strawberry yogurt | 125 ml |
| ¼ cup | sliced ripe strawberries | 50 ml |

Using ribber agitator, puree berries with other ingredients. Using smooth agitator (20) at high speed, blend until thick.

Example 3

FROTHED MILK FOR "CAPPUCCINO"

a) Plain Frothed Milk

| | | |
|---|---|---|
| ¾ cup | 1%, 2% or skim milk | 175 ml |

Using smooth agitator (20) at high speed, process milk until a fine froth appears. Put frothed milk into one quart microwaveable container and microwave on high until milk froth expands. Spoon on top of expresso or strong coffee. Top with dash of cocoa, cinnamon or nutmeg.

b) Khalua Cappuccino

Add 2 tbsp (30 ml) of khalua to milk (as in Example 3b)) before frothing.

c) Cocoa

| | | |
|---|---|---|
| ¾ cup | 1%, 2% or skim milk | 175 ml |
| 1 tbsp | cocoa | 15 ml |
| 1 tbsp | sugar | 15 ml |

Using smooth agitator (20) at high speed, process until a fine froth appears. Put frothed milk into a one quart microwaveable container and microwave on high until milk froth expands and cocoa is cooked. Froth can be used for cappuccino or as a rich tasting cocoa.

I claim:

1. A method of generating a frothed milk composition comprising:

housing a milk composition in an open vessel, immersing a planar agitator blade in said milk composition and rotating said agitator blade in said milk composition, about a longitudinal axis, at a high speed effective to entrain air in said composition and produce a frothed milk product, said agitator blade having a pair of opposed smooth, flat faces extending perpendicularly of said longitudinal axis, and a smooth cylindrical outer wall between said opposed faces, said outer wall having a circumferential length significantly greater than the distance between said opposed faces, wherein said milk composition consists of a flavouring and skim milk and said frothed milk composition is a milk shake.

2. A method according to claim 1, wherein said rotating creates a condition of low turbulence in said milk composition with entrainment of a multitude of fine air bubbles such that a consistency of a thick milk shake is achieved, and recovering the thick milk shake thus generated.

3. A method of generating a frothed milk composition comprising:

housing a milk composition in an open vessel, immersing a planar agitator blade in said milk composition and rotating said agitator blade in said milk composition, about a longitudinal axis, at a high speed effective to entrain air in said composition and produce a frothed milk product, said agitator blade having a pair of opposed smooth, flat faces extending perpendicularly of said longitudinal axis, and a smooth cylindrical outer wall between said opposed faces, said outer wall having a circumferential length significantly greater than the distance between said opposed faces, wherein said milk composition consists of a flavouring and non-fat milk and said frothed milk composition is a milk shake.

4. A method of generating a frothed milk composition comprising:

housing a milk composition in an open vessel, immersing a planar agitator blade in said milk composition and rotating said agitator blade in said milk composition, about a longitudinal axis, at a high speed effective to entrain air in said composition and produce a frothed milk product, said agitator blade having a pair of opposed smooth, flat faces extending perpendicularly of said longitudinal axis, and a smooth cylindrical outer wall between said opposed faces, said outer wall having a circumferential length significantly greater than the distance between said opposed faces, wherein said milk composition consists of a flavouring and milk containing 1%, by weight, of milk fats and said frothed milk composition is a milk shake.

5. A method of generating a frothed milk composition comprising:

housing a milk composition in an open vessel, immersing a planar agitator blade in said milk composition and rotating said agitator blade in said milk composition, about a longitudinal axis, at a high speed effective to entrain air in said composition and produce a frothed milk product, said agitator blade having a pair of opposed smooth, flat faces extending perpendicularly of said longitudinal axis, and a smooth cylindrical outer wall between said opposed faces, said outer wall having a circumferential length significantly greater than the distance between said opposed faces, wherein said milk composition consists of a flavouring and milk containing 2%, by weight, of milk fats and said frothed milk composition is a milk shake.

6. A method of generating a fruit or vegetable flavoured milk shake comprising:

i) housing a mixture of a milk composition and morsels of fruit or vegetable in an open vessel, ii) immersing a blender blade in said milk composition, iii) rotating said blender blade in said mixture, about a longitudinal axis, at a speed effective to puree said morsels, iv) removing said blender blade from the resulting flavoured mixture of the milk composition and the pureed morsels, v) immersing a planar agitator blade in said flavoured mixture, vi) rotating said agitator blade in said flavoured mixture about said longitudinal axis, at a high speed effective to entrain air in said flavoured composition and produce a flavoured milk shake; and wherein:

a) said blender blade having a pair of opposed flat blade faces extending perpendicularly of said longitudinal axis, and a smooth cylindrical outer blade wall between said opposed faces, said opposed faces comprising an upper face and a lower face, b) a first plurality of rounded ribs on said upper face, said first plurality extending radially of said longitudinal axis, each rib terminating in a bulbous member extending from an outer end of the rib, over the blade wall and the outer edge of the lower face;

the bulbous members of said first plurality being in circumferentially spaced apart relationship about said blade wall;

c) a second plurality of rounded ribs on said lower face; said second plurality extending radially of said longitudinal axis, each rib terminating in a bulbous member extending from an outer end of the rib over the blade wall and the outer edge of the upper face;

the bulbous members of said second plurality being in circumferentially spaced apart relationship about said blade wall;

d) said agitator blade having a pair of opposed smooth, flat faces extending perpendicularly of said longitudinal axis, and a smooth cylindrical outer wall between said opposed faces; and e) said outer wall having a circumferential length significantly greater than the distance between said opposed faces.

7. A method according to claim 6, wherein said bulbous members of said first and second pluralities are in alternating relationship about said blade wall.

8. A method according to claim 6, wherein said rotating in step vi) creates a condition of low turbulence in said flavoured composition with entrainment of a multitude of fine air bubbles such that a consistency of a thick milk shake is achieved, and recovering the thick milk shake thus generated.

9. A method according to claim 8, wherein said rotating about said longitudinal axis is under a power of about 100 watts.

10. A method according to claim 8, wherein said mixture in step i) consists of said milk composition and said morsels, and said milk composition consists of a milk selected from skim milk, non-fat milk, milk containing 1 or 2%, by weight, of milk fats, or said milk together with a low fat yogurt or low fat ice cream.

* * * * *